(12) United States Patent
Huang et al.

(10) Patent No.: US 10,797,988 B2
(45) Date of Patent: Oct. 6, 2020

(54) METHOD AND APPARATUS FOR CONTROLLING AND MANAGING A FIELD DEVICE USING AN INDUSTRY INTERNET OPERATING SYSTEM

(71) Applicant: KYLAND TECHNOLOGY CO., LTD., Beijing (CN)

(72) Inventors: Yi Huang, Beijing (CN); Yuanqing Tang, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 189 days.

(21) Appl. No.: 15/638,544

(22) Filed: Jun. 30, 2017

(65) Prior Publication Data
US 2018/0227214 A1    Aug. 9, 2018

(30) Foreign Application Priority Data
Feb. 9, 2017   (CN) .......................... 2017 1 0071597

(51) Int. Cl.
*H04L 12/751* (2013.01)
*H04L 12/24* (2006.01)
*H04L 29/08* (2006.01)
*H04L 12/26* (2006.01)

(52) U.S. Cl.
CPC .......... *H04L 45/026* (2013.01); *H04L 41/044* (2013.01); *H04L 67/025* (2013.01); *H04L 67/10* (2013.01); *H04L 67/12* (2013.01); *H04L 67/34* (2013.01); *H04L 41/0246* (2013.01); *H04L 41/082* (2013.01); *H04L 43/0817* (2013.01); *Y02P 90/02* (2015.11)

(58) Field of Classification Search
None
See application file for complete search history.

(56) References Cited

U.S. PATENT DOCUMENTS

| 2004/0015952 A1* | 1/2004 | Lajoie ..................... G06F 8/65 717/171 |
| 2004/0083471 A1* | 4/2004 | Nam ....................... G06F 8/65 717/168 |
| 2009/0083843 A1* | 3/2009 | Wilkinson, Jr. ...... H04L 9/3234 726/9 |

(Continued)

*Primary Examiner* — Philip J Chea
*Assistant Examiner* — Hassan A Khan
(74) *Attorney, Agent, or Firm* — Arent Fox LLP; Michael Fainberg

(57) ABSTRACT

The application relates to a method and apparatus for controlling and managing a field device using an industry Internet operating system, in this method, an industry cloud server sends a device identifier configuration strategy to an industry field device, so that the industry field device establishes a communication connection with the industry cloud server, generates the identifier of the industry field device, and further generates a list of device information; and the industry cloud server monitors and manages the industry field device over a cloud according to the list of device information sent by the industry field device on its own initiative. In this way, the industry field device can obtain the device identifier automatically without relying upon any specialized hardware device, and report the device information to the industry cloud server on its own initiative.

14 Claims, 5 Drawing Sheets

(56) References Cited

U.S. PATENT DOCUMENTS

| | | | | |
|---|---|---|---|---|
| 2010/0125473 A1* | 5/2010 | Tung | ............... | G06F 9/5072 709/200 |
| 2012/0004743 A1* | 1/2012 | Anne | ............... | G05B 19/409 700/83 |
| 2012/0054289 A1* | 3/2012 | Aytulu | ............... | G06Q 10/107 709/206 |
| 2012/0278454 A1* | 11/2012 | Stewart | ............... | H04L 67/34 709/220 |
| 2013/0106906 A1* | 5/2013 | Roche | ............... | G06T 11/206 345/629 |
| 2013/0211546 A1* | 8/2013 | Lawson | ............... | G06F 9/5072 700/9 |
| 2014/0229607 A1* | 8/2014 | Jung | ............... | H04L 43/0876 709/224 |
| 2014/0277618 A1* | 9/2014 | Nixon | ............... | G06F 3/048 700/83 |
| 2014/0337277 A1* | 11/2014 | Asenjo | ............... | G06F 16/283 707/603 |
| 2014/0344798 A1* | 11/2014 | Sasaki | ............... | G05B 19/056 717/170 |
| 2014/0351334 A1* | 11/2014 | Bandyopadhyay | ..... | H04L 67/16 709/204 |
| 2015/0341292 A1* | 11/2015 | Ahmed | ............... | H04L 51/18 709/206 |
| 2016/0182323 A1* | 6/2016 | Ferguson | ............... | H04L 43/045 709/224 |

\* cited by examiner

METHOD AND APPARATUS FOR CONTROLLING AND MANAGING A FIELD DEVICE USING AN INDUSTRY INTERNET OPERATING SYSTEM

This application claims the benefit of Chinese Patent Application No. 201710071597.2, filed with the State Intellectual Property Office of People's Republic of China on Feb. 9, 2017, and entitled "Method and Apparatus for Controlling and Managing a Field Device Using an Industry Internet Operating System", the content of which is hereby incorporated by reference in its entirety.

FIELD

The present application relates to the field of industry communications, and particularly to a method and apparatus for controlling and managing a field device using an industry Internet operating system.

BACKGROUND

An industry Ethernet bus refers to a mode in which data are shared over a local area network, where an industry field application is generally also involved in the local area network, and a communication connection needs to be established between an industry cloud server and industry field devices so that the former exchanges information with, and controls and manages the latter, where the communication connection is established on the precondition that both of them can know the device identifiers of the industry field devices. Here the industry field devices include a master device and a slave device, where the master device can communicate with a number of slave devices only after it knows the device identifiers and other related device information of the respective slave devices.

In the prior art, in the context of the industry Ethernet bus, an industry field device can not transmit any data to the industry cloud server on its own initiative considering security and other factors, so both of them need to obtain the device identifier of the industry field device as a result of a manual operation by a user. For example, the device identifier (NodeID) of the slave device is obtained as follows: taking POWERLINK as an example, the device identifier of the slave device is allocated in the existing POWERLINK protocol generally using a toggle switch, where the user needs to configure the NodeID manually, so that the user can access the master device, and start to operate the slave device normally, only after he or she configures the NodeID and a configuration file of the slave device in advance.

For example, if a slave device needs to be newly added to some master device, then firstly a toggle switch will be set for the newly added slave device, the NodeID will be set for the slave device, then the corresponding configuration file will be edited for the NodeID of the slave device, and then the configuration file will be imported manually from the master device; and the master device can know the device identifier and the device information of the slave device, so that after the slave device is powered on, it can operate normally, and receive a message sent by the master device to the slave device, and also a corresponding communication link can be established, so that the primary device can manage and control the slave device.

However in the prior art, this solution fails to enable the communication connection to be established automatically between the industry field devices and the industry server, and this solution may not be so flexible and intelligent in configuration, and may be troublesome in operation; and the slave device has to rely upon such a piece of specialized hardware, e.g., the toggle switch, that the slave device may be restricted in terms of its design and selection, thus degrading the efficiency of managing the device.

SUMMARY

Embodiments of the application provide a method and apparatus for controlling and managing a field device using an industry Internet operating system so as to address the problem in the prior art that a slave device being managed relies upon such more troublesome manual operations that degrade the efficiency of managing the device, and to further attain the object of enabling a communication connection to be established automatically between the industry field device and a industry cloud server for the industry cloud server to control the industry field device directly.

Particular technical solutions according to the embodiments of the application are as follows:

An embodiment of the application provides a method for controlling and managing a field device using an industry Internet operating system including at least an industry cloud server and industry field devices, wherein:

receiving, by each industry field device, a device identifier configuration strategy issued by the industry cloud server, establishing a communication connection with the other industry field device according to the device identifier configuration strategy, and further generating a list of device information; and sending, by the industry field device, the list of device information to the industry cloud server on its own initiative, so that the industry cloud server controls the industry field device according to the list of device information.

In the embodiment of the application, the industry field device can receive the device identifier configuration strategy issued by the industry cloud server, and establish the communication connection with the other industry field device according to the device identifier configuration strategy, and can further generate the list of device information; and the industry field device can send the list of device information to the industry cloud server on its own initiative, so that the industry cloud server can control the industry field device according to the list of device information. In this way, the industry field device can exchange information with the industry cloud server on its own initiative, and with the device identifier configuration strategy, the industry field device can obtain the device identifier on its own initiative, and can further establish the communication connection automatically with the other industry field device, so that the industry field device can be controlled and managed while alleviating the reliance upon manual operations, simplifying the operations, and enabling more intelligent operations.

Preferably the industry field devices include a master device and a slave device, and establishing, by the industry field device, the communication connection with the other industry field device according to the device identifier configuration strategy, and further generating the list of device information includes:

receiving, by the master device, a device identifier request sent by the slave device on its own initiative upon being powered on, wherein the device identifier request includes at least device information of the slave device;

allocating, by the master device, a device identifier for the slave device according to the device information, and sending the device identifier to the slave device, so that the slave device is registered, and acknowledges, using the device identifier; and generating, by the master device, the list of device information according to the device identifier and the device information.

Thus the slave device can obtain the device identifier automatically without relying upon any specialized hardware device, and can report the device information of the slave device to the master device on its own initiative without being configured manually on the master device, thus alleviating the reliance upon manual operations, simplifying the operations, and enabling more intelligent operations, and better centralized management and control on the slave device.

Preferably allocating, by the master device, the device identifier for the slave device according to the device information includes:

determining, by the master device, a preset range of values for the device identifier corresponding to the device identifier according to the device type, wherein the device information includes at least the device type; and allocating, by the master device, the device identifier for the slave device from the range of values for the device identifier according to the priority of the slave device.

Preferably the method further includes:

receiving, by the master device, a registration acknowledgment information update message sent by the slave device, and determining that the slave device operates normally, and updating the list of device information corresponding to the slave device, in response to the registration acknowledgment information update message.

Preferably the method further includes:

sending, by the master device, a preset message to the slave device at a preset periodicity; and determining, by the master device, whether a response message of the slave device to the preset message is received, and if so, then determining that the slave device operates normally; otherwise, determining that the slave device is powered off or goes offline, and deleting the information in the list of device information corresponding to the slave device.

Preferably sending, by the master device, the list of device information to the industry cloud server, so that the industry cloud server controls the industry field device according to the list of device information includes:

receiving, by the master device, an upgrade command sent by the industry cloud server for the slave device;

determining, by the master device, the corresponding slave device according to the upgrade command and the list of device information; and sending, by the master device, the upgrade command to the corresponding slave device to instruct the corresponding slave device to be upgraded in response to the upgrade command.

An embodiment of the application provides an apparatus for controlling and managing a field device using an industry Internet operating system including at least an industry cloud server and industry field devices, wherein:

each industry field device is configured to receive a device identifier configuration strategy issued by the industry cloud server, to establish a communication connection with another industry field device according to the device identifier configuration strategy, and to further generate a list of device information; and the industry field device is configured to send the list of device information to the industry cloud server on its own initiative, so that the industry cloud server controls the industry field device according to the list of device information.

In the embodiment of the application, the industry field device can receive the device identifier configuration strategy issued by the industry cloud server, and establish the communication connection with the other industry field device according to the device identifier configuration strategy, and can further generate the list of device information; and the industry field device can send the list of device information to the industry cloud server on its own initiative, so that the industry cloud server can control the industry field device according to the list of device information. In this way, the industry field device can exchange information with the industry cloud server on its own initiative, and with the device identifier configuration strategy, the industry field device can obtain the device identifier on its own initiative, and can further establish the communication connection automatically with the other industry field device, so that the industry field device can be controlled and managed while alleviating the reliance upon manual operations, simplifying the operations, and enabling more intelligent operations.

Preferably the industry field devices include a master device and a slave device, and the master device configured to establish the communication connection with the other industry field device according to the device identifier configuration strategy, and to further generate the list of device information is configured:

to receive a device identifier request sent by the slave device on its own initiative upon being powered on, wherein the device identifier request includes at least device information of the slave device;

to allocate a device identifier for the slave device according to the device information, and to send the device identifier to the slave device, so that the slave device is registered, and acknowledges, using the device identifier; and to generate the list of device information from the device identifier and the device information.

Thus the slave device can obtain the device identifier automatically without relying upon any specialized hardware device, and can report the device information of the slave device to the master device on its own initiative without being configured manually on the master device, thus alleviating the reliance upon manual operations, simplifying the operations, and enabling more intelligent operations, and better centralized management and control on the slave device.

Preferably the master device configured to allocate the device identifier for the slave device according to the device information is configured:

to determine a preset range of values for the device identifier corresponding to the device identifier according to the device type, wherein the device information includes at least the device type; and to allocate the device identifier for the slave device from the range of values for the device identifier according to the priority of the slave device.

Preferably the master device is further configured:

to receive a registration acknowledgment information update message sent by the slave device, and to determine that the slave device operates normally, and to update the list of device information corresponding to the slave device, in response to the registration acknowledgment information update message.

Preferably the master device is further configured:

to send a preset message to the slave device at a preset periodicity; and to determine whether a response message of the slave device to the preset message is received, and if so, to determine that the slave device operates normally; otherwise, to determine that the slave device is powered off or goes offline, and to delete the information in the list of device information corresponding to the slave device.

Preferably the master device configured to send the list of device information to the industry cloud server, so that the industry cloud server controls the industry field device according to the list of device information is configured:

to receive an upgrade command sent by the industry cloud server for the slave device;

to determine the corresponding slave device according to the upgrade command and the list of device information; and to send the upgrade command to the corresponding slave device to instruct the corresponding slave device to be upgraded in response to the upgrade command.

DETAILED DESCRIPTION OF THE EMBODIMENTS

The technical solutions according to the embodiments of the application will be described below clearly and fully with reference to the drawings in the embodiments of the application, and apparently the embodiments described below are only a part but not all of the embodiments of the application. Based upon the embodiments here of the application, all the other embodiments which can occur to those ordinarily skilled in the art without any inventive effort shall fall into the scope of the application.

An industry Internet operating system refers to an underlying technology to enable networked industry control, cloud control, a visualized factory, an analysis of large industry data, etc., and also refers to a unified platform to enable a control information flow, a management information flow, and a supply link information flow to be integrated, so that security and controllability of a next-generation industry architecture can be guaranteed.

Figure 1:
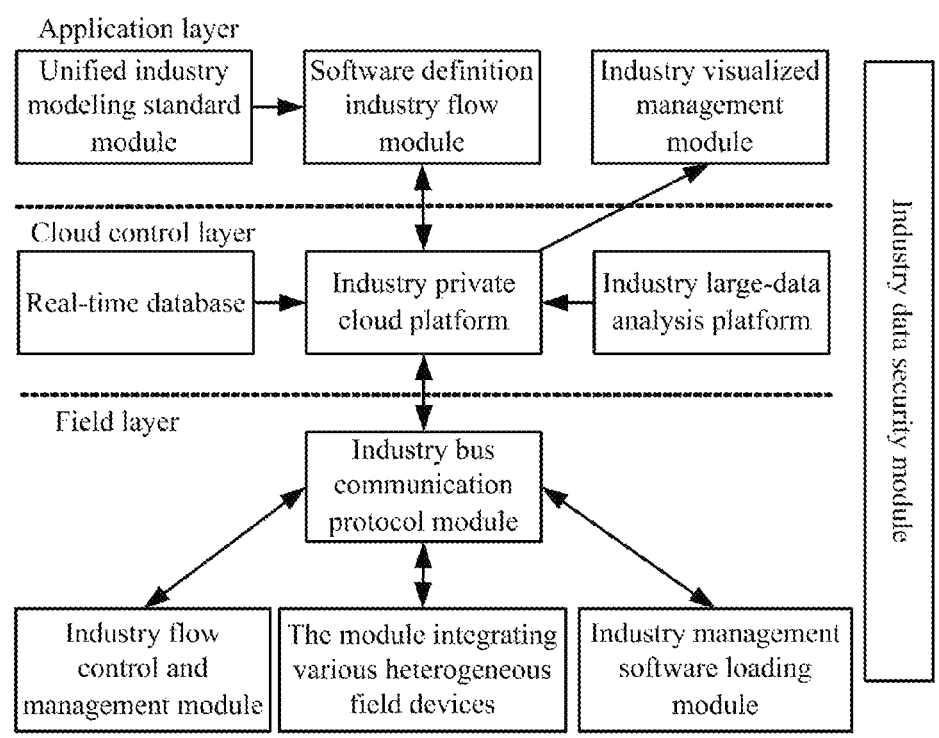
FIG. 1 is an architectural diagram of an industry Internet operating system according to an embodiment of the application.

Referring to FIG. 1, there is an architectural diagram of an industry Internet operating system including an application layer, a cloud control layer, and a field layer, where the application layer includes an industry modeling standard module, a software definition industry flow module, and an industry visualized management module, all of which are unified; the cloud control layer includes a real-time database, an industry private cloud platform, and a large industry data analysis platform; and the field layer includes an industry bus communication protocol module, an industry flow control and management module, the module integrating various heterogeneous field devices, and an industry management software loading module, and the industry Internet operating system further includes industry data security modules at the application layer, the cloud control layer, and the field layer.

For the industry flow control and management module, in order to address the problem in the prior art that a slaved device being managed more relies upon troublesome manual operations, and the device identifier of the device has to be configured manually, thus degrading the efficiency of managing the device, and to further attain the object of enabling a communication connection to be established automatically between the industry field device and a industry cloud server for the industry cloud server to control the industry field device directly, in the embodiments of the application, the industry field device configures a strategy for the device identifier so that a communication connection is established between respective industry field devices, and generates and sends a list of device information to an industry cloud server on its own initiative, so that a communication connection is established between the industry cloud server and the industry field device, and the industry cloud server controls and manages the industry field device.

The solution according to the application will be described below in connection with particular embodiments thereof, and of course, the application will not be limited to the following embodiments.

Figure 2:
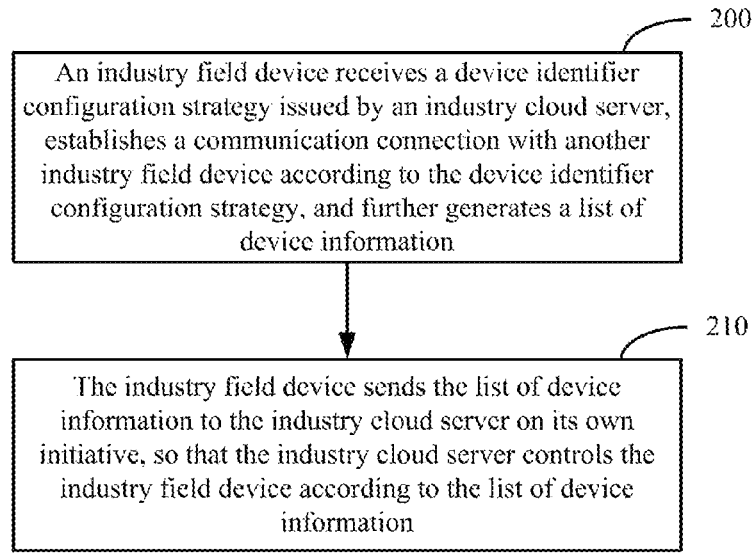
FIG. 2 is a general flow chart of a method for controlling and managing a field device using an industry Internet operating system according to an embodiment of the application.

Referring to FIG. 2, a particular flow of a method for controlling and managing a field device using an industry Internet operating system according to an embodiment of the application is as follows:

In the operation 200, an industry field device receives a device identifier configuration strategy issued by an industry cloud server, establishes a communication connection with another industry field device according to the device identifier configuration strategy, and further generates a list of device information.

Here the list of device information includes at least device identifiers and device information of the industry field devices.

In the operation 210, the industry field device sends the list of device information to the industry cloud server on its own initiative, so that the industry cloud server controls the industry field device according to the list of device information.

Furthermore in an embodiment of the application, the device identifier configuration strategy can be retrieved from the industry cloud server, or can be configured in advance directly in the industry field device.

In this way, in the embodiments of the application, the industry field device can establish the communication connection with the other industry field device according to the device identifier configuration strategy, and can generate and send the list of device information to the industry cloud server on its own initiative, so that the industry cloud server can establish the communication connection automatically with the industry field device, and control and manage the industry field device; and the industry field device can exchange information with the industry cloud server on its own initiative, thus alleviating the reliance upon manual operations, simplifying the operations, and enabling more intelligent operations.

It shall be noted that the industry field devices include a master device and a slave device, where the slave device is also controlled by the master device, so in a particular implementation, generally the master device performs the method above for controlling and managing a field device using an industry Internet operating system, and the processes in the operation 200 and the operation 210 will be introduced below in details from the perspective of the master device and the slave device.

Figure 3:
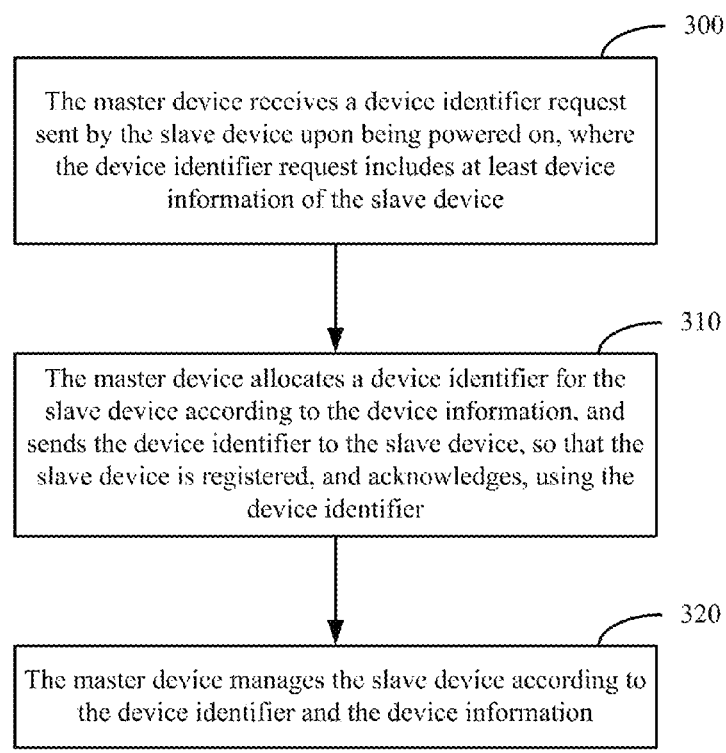
FIG. 3 is a general flow chart of the operation 200 according to an embodiment of the application.

(1) In the operation 200, referring to FIG. 3, a particular flow thereof according to an embodiment of the application is as follows:

In the operation 300, the master device receives a device identifier request sent by the slave device on its own initiative upon being powered on, where the device identifier request includes at least device information of the slave device.

In practice, in an industry Ethernet bus environment, the slave device is controlled, and the master device manages and controls the slave device; and the slave device needs to be configured in advance with a device identifier, and the device identifier and the related device information of the slave device is imported into the master device, so that the master device can manage and control the slave device only if the slave device is powered on and accesses the master device, thus resulting in more reliance upon the troublesome manual operations.

In an embodiment of the application, the device identifier will not be configured in advance, so that the operations can be simplified, and the slave device can send the device identifier request carrying the device information of the slave device to the master device on its own initiative after being powered on, so that the master device allocates the device identifier for the slave device.

In an embodiment of the application, in the operation 300, after the salve device is powered on and initialized, a state machine of the slave device will not operate until there is a delay of a preset fixed clock cycle, for example, a first aperiodical synchronization message sent by the master device, e.g., an SOA message, is received, so that a communication port between the master device and the slave device can be ensured to be normal, and then the slave device will send the device identifier request to the master device.

Here the device identifier request includes at least the device information of the slave device.

It shall be noted that the device information carried in the device identifier request can include general device information, e.g., a device type, device positional information, device manufacturer information, device factory code information, etc., considering a bandwidth and other factors.

In the operation 310, the master device allocates a device identifier for the slave device according to the device information, and sends the device identifier to the slave device, so that the slave device is registered, and acknowledges, using the device identifier.

Particularly in the operation 310:

Firstly the master device allocates the device identifier for the slave device according to the device information.

Particularly 1) the master device determines a preset range of values for the device identifier corresponding to a device type according to the device type, where the device information includes at least the device type.

The device type of the slave device possibly accessing the master device is generally known in advance, so the range of values for the device identifier is divided into different segments for different device types, and stored in the master device. For example, if the range of values for the device identifier is 0 to 255, and there are three types of devices, including a sensor device, a servo motor device, and a operationped motor device respectively, which can access the master device, then the range of 0 to 255 may be divided into three segments, particularly equally or unequally dependent upon a real situation, although the embodiment of the application will not be limited thereto.

2) The master device allocates the device identifier for the slave device from the range of values for the device identifier according to the priority of the slave device.

Here the priority of the slave device can be determined according to the importance, level, and other information of the slave device.

Moreover since it is easier for the device identifier with a smaller value to be found by the inquiring master device, preferably the slave device at a higher priority is allocated a smaller device identifier in an embodiment of the application.

For example, the range of values for the device identifier corresponding to the servo motor type is 128 to 192, and if the slave device is a device of the servo motor type, then it will be allocated a device identifier in the range of 128 to 192, and preferably the slave device with a higher priority will be allocated the device identifier with a smaller value.

Furthermore if the preset range of values for the device identifier corresponding to the device type has been exhausted, then a device identifier will be selected in another remaining range of values for the device identifier, and allocated for the slave device.

Furthermore the master device generates a list of device information according to the device information and the device identifiers of the respective slave devices.

Referring to Table 1, for example, there is a list of device information stored in the master device. For example, there are three slave devices accessing the master device, where two of the slave devices are sensors with different functions of the sensor device type, and the remaining slave device is of the servo device type.

TABLE 1

| List of device information in the master device | | | | | | | |
|---|---|---|---|---|---|---|---|
| index | NodeID | subID | Status | Dev_Type | Dev_Pos | Dev_Manu | Dev_Code |
| 1 | 0x01 | 0x00 | 0x01 | 0x8001 | 0x6001 | 0x5001 | 0x1234 |
| 2 | 0x02 | 0x01 | 0x00 | 0x8001 | 0x6003 | 0x5001 | 0x1235 |
| 3 | 0x03 | 0x00 | 0x00 | 0x8002 | 0x6004 | 0x5002 | 0x1234 |

Respective table entries will be defined particularly as follows:

Index: the Index entry ranges from 0 to 65535.

NodeID: an allocated device identifier ranges from 0 to 255.

SubID: an allocated device sub-identifier represents a sub-type of the same device type, where since there may be a number of different device sub-types of the same device type, for example, there may be a temperature sensor, a pressure sensor, etc., of the sensor device type, a SubID ranging from 0 to 255 can be added for distinguishing.

Status: an operating status of the device, where if it takes the value of 0, then it will indicate that the device is not operating normally, and if it takes the value of 1, then it will indicate that the device is operating normally; and this field can be extended to indicate a number of operating states of the device, e.g., Sleep, and it can range from 0 to 255.

Dev_Type: the device type, where this field is encoded for the pre-defined device type, for example, the sensor device type can be encoded into 0x8001, the servo motor device type can be encoded into 0x8002, etc., and this field can range from 0 to 65535.

Dev_Pos: device positional information, where the device positional information can be encoded in the following two patterns: in a first pattern, it is fully encoded into 16 bits to uniquely identify the position of the device, and generally in this case, devices of the same device type are numbered one by one in such an industry field as a pipeline; and in a second pattern, it is segmented and encoded into 16 bits including the first 8 bits representing an encoded domain, and the last 8 bits representing coordinates. In the same bus context, various devices interoperate with each other, but all the functioning devices can be zoned and managed, where the devices in the respective zones are indexed in sequence with their positions being indicated.

Dev_Manu: device manufacturer information, where all the device manufacturers supported by the master device or a server are encoded.

Dev_Code: device factory code information unique to the device.

It shall be noted that the values of the respective table entries in Table 1 are merely exemplary. The ranges of values for the respective table entries in the list of device information as described above are only optional ranges of values, and can be preset as required in reality, although the embodiment of the application will not be limited thereto.

Preferably in an embodiment of the application, the list of device information is a hash table, where it is easier for the device identifier with a smaller value to be found by the inquiring master device.

Then the master device sends the device identifier to the slave device, so that the slave device is registered, and acknowledges, using the device identifier.

Particularly the master device sends the device identifier to the slave device in a preset message format by multicasting or broadcasting it.

This is because the slave device and the master device at this time do not know to which slave device the device identifier corresponds, so the master device sends a message carrying the device identifier by multicasting or broadcasting it; and the slave device receiving the message can know that the message has been sent for allocating a device identifier, and if it has sent the device identifier request, and has not been provided with any device identifier, then it will process the message, be provided with the device identifier, and determine the device identifier as its device identifier, and furthermore it will be registered and acknowledge therewith, update its register and table entry information related to the device identifier, and send a registration acknowledgment information update message to the master device, and at this time, a state machine of the slave device will start to operate normally.

Furthermore the master device receives the registration acknowledgment information update message sent by the slave device, and determines that the slave device operates normally, and updates the list of device information corresponding to the slave device, in response to the registration acknowledgment information update message.

At this time, the master device receiving the registration acknowledgment information update message can determine that the slave device has obtained its device identifier, and the master device can set the value of the Status entry corresponding to the slave device to 1 indicating that the slave device starts to operate normally; and since the device identifier request carries only the general device information, the slave device obtains the device identifier, and then sends the registration acknowledgment information update message which can further carry some other updated device information or other particular device information; and furthermore the master device updates the device information corresponding to the slave device accordingly upon receptions of the registration acknowledgment information update message.

Furthermore the master device can upload the list of device information to the industry cloud server.

In this way, a more support can be provided for a subsequent intelligent decision, a software definition and production process, etc. of the industry cloud server to thereby alleviate operations by a field-level human operator, and also facilitate better management.

In the operation 320, the master device generates a list of device information from the device identifier and the device information.

Furthermore the master device can also control and manage the slave device according to the list of device information.

In this way, the device identifier and the device information of the slave device is stored in the master device, and the slave device also obtains its device identifier, so that a communication connection is established between the master device and the slave device, and the master device can send various messages and commands to the slave device according to the device identifier and the device information to thereby manage the slave device.

Furthermore after the master device establishes the connection with the slave device, the method further includes:

Firstly the master device sends a preset message to the slave device at a preset periodicity.

Then the master device determines whether a response message of the slave device to the preset message is received, and if the master device receives the response message of the slave device to the preset message, then it will determine that the slave device operates normally; if the master device doesn't receive the response message of the slave device to the preset message, it will determine that the slave device is powered off or goes offline, and delete the information in the list of device information corresponding to the slave device.

In this way, the list of device information in the master device can be updated in real time and accurately.

(2) In the operation 210, the master device sends the list of device information to the industry cloud server on its own initiative, so that the industry cloud server controls the industry field device according to the list of device information.

Here the industry cloud server can send various messages and commands to the industry field device to control and manage the industry field device accordingly, for example, the slave device being managed can be upgraded particularly as follows:

Firstly the master device receives an upgrade command sent by the industry cloud server, where the upgrade command is sent for the slave device.

Then the master device determines the corresponding slave device according to the upgrade command and the list of device information.

Finally the master device sends the upgrade command to the corresponding slave device to instruct the corresponding slave device to be upgraded in response to the upgrade command.

The embodiments above will be described below in further details in connection with several particular application scenarios thereof.

Figure 4:
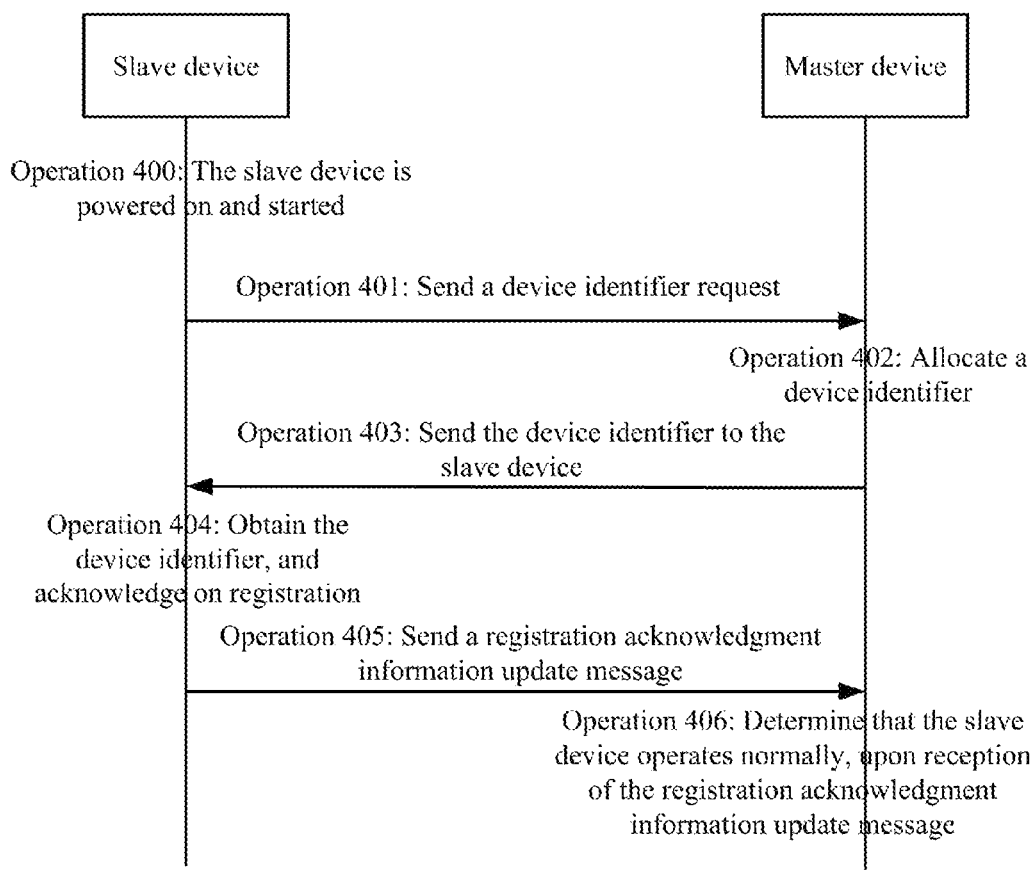
FIG. 4 is a flow chart of the method in a first application scenario according to an embodiment of the application.

First Application Scenario:

Particularly referring to FIG. 4, a method for controlling and managing a field device using an industry Internet operating system according to an embodiment of the application is performed particularly as follows:

In the operation 400, a slave device is powered on and started.

In the operation 401, the slave device sends a device identifier request to a master device.

Here the device identifier request includes at least device information of the slave device.

Particularly a device identifier request message is sent, for example, the message is DA=0x0111-1e00-ff01, SA=MAC Address of Slave Device, Dest: 255, Src: 0, and Device Information.

Here DA represents the MAC address, Dest (Destination ID) represents a broadcast address, Src (Source ID) takes the value of 0 representing a special NodeID which is an initial default value of a device identifier of the slave device for which no NodeID is allocated.

In the operation 402, the master device allocates a device identifier.

Furthermore the master device updates a locally stored list of device information, and at this time, the value of Status corresponding to the slave device is 0 indicating that the slave device does not operate normally.

In the operation 403, the master device sends the device identifier to the slave device.

Particularly the master device sends a response message by multicasting or broadcasting it, for example, the response message is DA=0x0111-1e00-ff02, SA=MAC Address of Master Device, Dest: 255, Src: 240, and NewID=128.

Here 240 represents the NodeID of the master device, and 128 is assumed as the device identifier allocated by the master device for the slave device.

In the operation 404, the slave device obtains the device identifier, and is registered and acknowledges.

Particularly the slave device processes the response message, obtains the device identifier, and updates its related information using the device identifier, and thereafter the slave device can communicate over a bus using the device identifier.

In the operation 405, the slave device sends a registration acknowledgement information update message to the master device.

At this time, in the message sent by the slave device, Src represents the device identifier obtained by the slave device from the response message, and Dest represents the device identifier of the master device. At this time the slave device starts to operate normally.

In the operation 406, the master device determines that the slave device operates normally, upon reception of the registration acknowledgement information update message.

Particularly the master device updates the value of Status corresponding to the slave device to 1 indicating that the slave device operates normally.

The master device updates the corresponding list of device information according to the registration acknowledgement information update message.

In a second application scenario, a new slave device joins.

Figure 5:
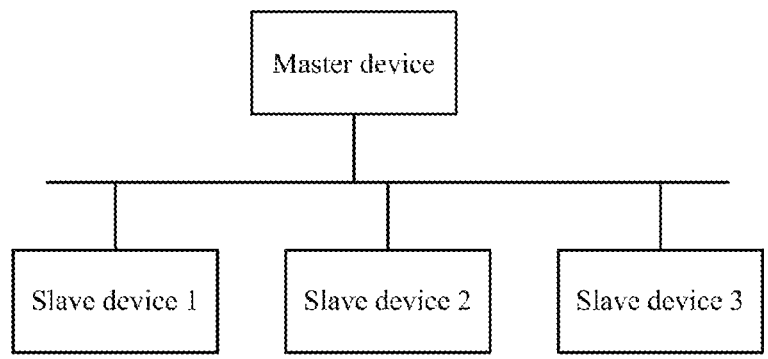
FIG. 5 is a schematic diagram of a connection relationship between a master device and slave devices according to an embodiment of the application.

Referring to FIG. 5, there is a schematic diagram of a connection relationship between a master device and slave devices according to an embodiment of the application, and for example, there are three slave devices including a slave device 1, a slave device 2, and a slave device 3 respectively accessing the master device, where the slave device 2 is a newly joining slave device.

Firstly the slave device 2 is powered on, and if a communication port operates normally, then the slave device will receive an SOA message sent by the master device, and then send a device identifier request message to the master device.

Then the master device identifies and processes device information of the newly joining slave device 2 according to the device identifier request message, and allocates a device identifier dynamically for the slave device 2.

Finally the slave device is registered and acknowledges, and then starts to operate normally, so that it can receive in real time various messages and commands sent by the master device.

In a third application scenario, a slave device is powered off or goes offline.

Referring to FIG. 5, the slave device 3 is a slave device being powered off or going offline.

Firstly the slave device obtains dynamically a device identifier, and is registered, and then starts to operate normally.

Then the master device sends a broadcast message to the respective slave devices at a fixed cycle periodicity.

Then the slave device sends a response message to the master device.

Finally if the slave device 3 is powered off and goes offline, then the master device will not receive any response message of the slave device 3 in the fixed periodicity, and then determine that the slave device 3 has been powered off or gone offline, release a device identifier resource corresponding to the slave device 3, and delete entries corresponding to the slave device 3 from a list of device information.

In a fourth application scenario, information of a slave device is upgraded.

Referring to FIG. 5, the slave device 3 is a slave device to be upgraded.

Firstly an industry cloud server sends an upgrade command of the slave device to the master device.

In practice, if the slave device is an intelligent terminal device, then generally it will be upgraded, and this upgrade strategy may be a command from an information management layer instead of the master device, for example, the industry cloud server may send the upgrade command for the slave device of some device type.

In an embodiment of the application, the information management layer will not upgrade the respective slave devices one by one, and thereafter the master device will not reconfigure them, but instead since a list of device information of the slave devices is stored in both the information management layer and the master device, the information management layer can send the upgrade command directly to the master device, for example, to upgrade the slave device of some device type to Version 5.0.

Then the master device determines the corresponding slave device according to the upgrade command and the list of device information, and sends the upgrade command to the corresponding slave device.

For example, there are a number of slave devices of the device type hosted by the master device, but not all the slave devices need to be upgraded because some slave devices operate with Version 5.0, for example, only the slave device 1 does not operate with Version 5.0, so the master device determines that only the slave device 1 does not operate with Version 5.0 according to the list of device information, and further sends the upgrade command to the slave device 1 by uni-casting it; and the master device can also update the list of device information corresponding to the slave device 1 instead of thereafter reconfiguring it manually.

Finally the slave device is upgraded in response to the upgrade command.

Figure 6:
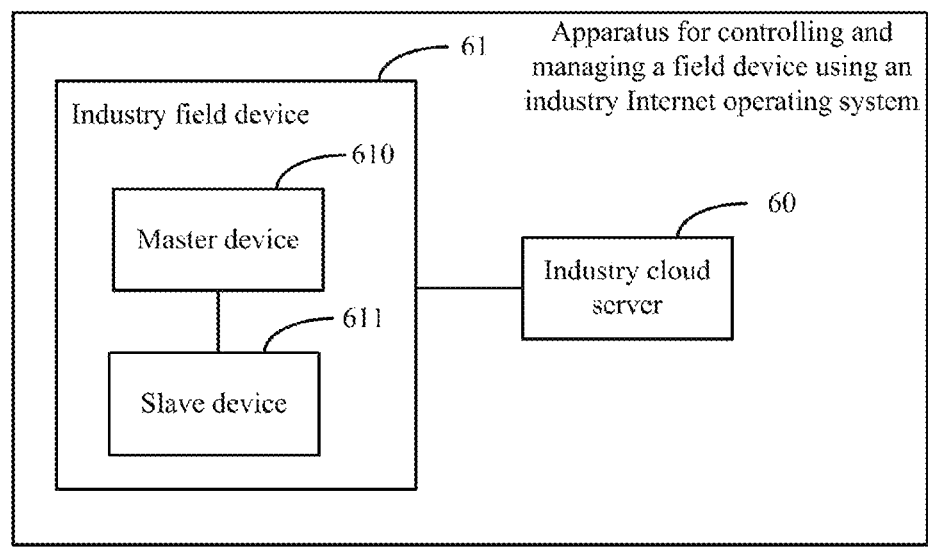
FIG. 6 is a schematic structural diagram of an apparatus for controlling and managing a field device using an industry Internet operating system according to an embodiment of the application.

Further to the embodiments above, referring to FIG. 6, an apparatus for controlling and managing a field device using an industry Internet operating system according to an embodiment of the application includes at least an industry cloud server 60 and industry field devices 61, where:

Each industry field device 61 is configured to receive a device identifier configuration strategy issued by the industry cloud server 60, to establish a communication connection with another industry field device 61 according to the device identifier configuration strategy, and to further generate a list of device information; and The industry field device 61 is configured to send the list of device information to the industry cloud server 60 on its own initiative, so that the industry cloud server 60 controls the industry field device 61 according to the list of device information.

Preferably the industry field devices 61 include a master device 610 and a slave device 611, and the master device 610 configured to establish the communication connection with the other industry field device 61 according to the device identifier configuration strategy, and to further generate the list of device information is configured:

To receive a device identifier request sent by the slave device 611 on its own initiative upon being powered on, where the device identifier request includes at least device information of the slave device 611;

To allocate a device identifier for the slave device 611 according to the device information, and to send the device identifier to the slave device 611, so that the slave device 611 is registered, and acknowledges, using the device identifier; and To generate the list of device information from the device identifier and the device information.

Preferably the master device 610 configured to allocate the device identifier for the slave device 611 according to the device information is configured:

To determine a preset range of values for the device identifier corresponding to the device identifier according to the device type, where the device information includes at least the device type; and To allocate the device identifier for the slave device 611 from the range of values for the device identifier according to the priority of the slave device 611.

Preferably the master device 610 is further configured:

To receive a registration acknowledgment information update message sent by the slave device 611, and to determine that the slave device 611 operates normally, and to update the list of device information corresponding to the slave device, in response to the registration acknowledgment information update message.

Preferably the master device 610 is further configured:

To send a preset message to the slave device 611 at a preset periodicity; and

To determine whether a response message of the slave device to the preset message is received, and if the response message of the slave device to the preset message is received, to determine that the slave device 611 operates normally; if the response message of the slave device to the preset message is not received, to determine that the slave device 611 is powered off or goes offline, and to delete the information in the list of device information corresponding to the slave device 611.

Preferably the master device 610 configured to send the list of device information to the industry cloud server 60, so that the industry cloud server 60 controls the industry field device 61 according to the list of device information is configured:

To receive an upgrade command sent by the industry cloud server 60 for the slave device 611;

To determine the corresponding slave device 611 according to the upgrade command and the list of device information; and To send the upgrade command to the corresponding slave device 611 to instruct the corresponding slave device 611 to be upgraded in response to the upgrade command.

Further to the embodiments above, an embodiment of the application further provides a nonvolatile computer storage medium on which computer executable instructions are stored, where the computer executable instructions can be executed to perform the method for controlling and managing a field device using an industry Internet operating system according to any one of the method embodiments above.

Figure 7:
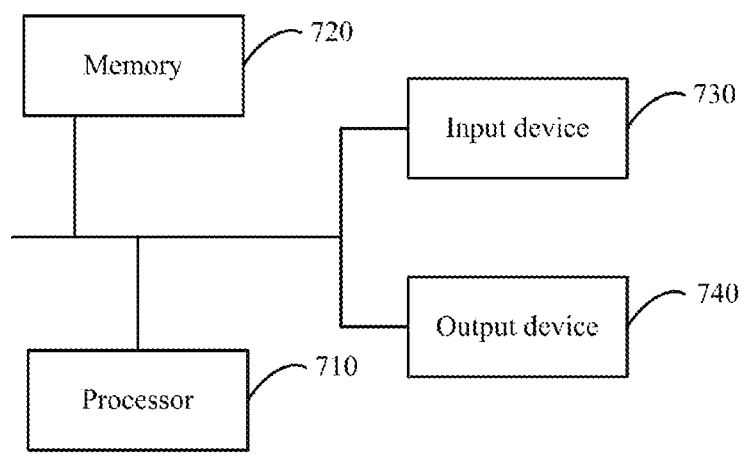
FIG. 7 is a schematic structural diagram of hardware of an electronic device in which a method for controlling and managing a field device using an industry Internet operating system according to an embodiment of the application is performed.

Further to the embodiments above, FIG. 7 is a schematic structural diagram of hardware of an electronic device in which a method for controlling and managing a field device using an industry Internet operating system according to an embodiment of the application is performed, and as illustrated in FIG. 7, the electronic device includes:

One or more processors 710, and a memory 720, where one processor 710 is illustrated in FIG. 7 by way of an example.

The electronic device for performing the method for controlling and managing a field device using an industry Internet operating system can further include an input device 730 and an output device 740.

The processor 710, the memory 720, the input device 730, and the output device 740 can be connected via a bus or otherwise, although they are connected over a bus in FIG. 7 by way of an example.

The memory 720 is a nonvolatile computer readable storage medium configured to store nonvolatile software program, nonvolatile computer executable program, and modules, e.g., program instructions/units corresponding to the method for controlling and managing a field device using an industry Internet operating system according to the embodiments of the application. The processor 710 is configured to execute the nonvolatile software program, the instructions, and the modules in the memory 720 to thereby perform various function application of and data processing by a server.

The memory 720 can include a program storage area and a data storage area, where an operating system, applications required for at least one function, etc., can be stored in the program storage area; and data created for use of the mobile device, etc., can be stored in the data storage area. Moreover the memory 720 can include a high-speed random access memory, and can further include a nonvolatile memory, e.g., at least one magnetic disks memory device, a flash memory device, or another volatile solid memory device. In some embodiments, the memory 720 can further include a memory arranged remote from the processor 710, where the remote memory can be connected with the electronic device over a network. Examples of the network include but will not be limited to the Internet, an enterprise intranet, a local area network, a mobile communication network, and a combination thereof.

The input device 730 can receive input digital or character information, and to generate a key signal input related to user setting and function control in the apparatus for controlling and managing a field device using an industry Internet operating system. The output device 740 can include a display screen, and other display devices.

The one or more modules are stored in the memory 720, and configured to be executed by the one or more processors 710 to perform the method for controlling and managing a field device using an industry Internet operating system according to any one of the method embodiments above.

The product above can perform the method according to any one of the embodiments of the application, and include the functional modules, and achieve the advantageous effects, corresponding to the method. Reference can be made to the description of the method according to the embodiments of the application for details of the product according to this embodiment.

The electronic device according to the embodiment of the application can be embodied in a number of forms including but not limited to:

(1) A mobile communication device which is characterized in that it possesses a mobile communication function, and primarily aims to provide voice and data communication. Such a terminal includes a smart mobile phone, (e.g., iPhone), a multimedia mobile phone, a functional mobile phone, a low-end mobile phone, etc.

(2) An ultra-mobile personal computer device which falls into the domain of personal computers, and which possesses computing and processing functions, and generally also a mobile access to the Internet. Such a terminal includes a PDA, an MID, a UMPC, or the like, e.g., iPad.

(3) A portable entertainment device which can display and play multimedia contents. Such a device includes an audio or video player (e.g., iPod), a palm game console, an electronic book, a smart toy, a portable on-vehicle navigation device, etc.

(4) A server which is a device providing a computing service, and which includes a processor, a hard disk, a memory, a system bus, etc., where the server is similar in architecture to a general-purpose computer, but is required to possess a higher processing capacity, higher stability, reliability, security, extensibility, manageability, etc., in order to provide the service more reliably.

(5) Other electronic devices capable of exchanging data.

In summary, in the embodiments of the application, the industry field device can receive the device identifier configuration strategy issued by the industry cloud server, and establish the communication connection with the other industry field device according to the device identifier configuration strategy, and can further generate the list of device information; and the industry field device can send the list of device information to the industry cloud server on its own initiative, so that the industry cloud server can control the industry field device according to the list of device information. In this way, the industry field device can exchange information with the industry cloud server on its own initiative, and with the device identifier configuration strategy, the industry field device can obtain the device identifier on its own initiative, and can further establish the communication connection automatically with the other industry field device, so that the industry field device can be controlled and managed while alleviating the reliance upon manual operations, simplifying the operations, and enabling more intelligent operations.

Furthermore the slave device can obtain the device identifier automatically with relying upon any specialized hardware device, and can report the device information of the slave device to the master device on its own initiative without being configured manually on the master device, thus alleviating the reliance upon manual operations, simplifying the operations, and enabling more intelligent operations, and better centralized management and control on the slave device.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for controlling and managing a field device using an industry Internet operating system comprising at least an industry cloud server and industry field devices, the method comprising:
receiving, by each industry field device, a device identifier configuration strategy issued by the industry cloud server, establishing a communication connection with the other industry field device according to the device identifier configuration strategy, and further generating a list of device information; and
sending, by the industry field device, the list of device information to the industry cloud server on its own initiative, so that the industry cloud server controls the industry field devices according to the list of device information;
wherein the industry field devices comprise a master device and multiple slave devices;
wherein sending, by the industry field device, the list of device information to the industry cloud server, so that the industry cloud server controls the industry field devices according to the list of device information comprises:
receiving, by the master device, an upgrade command sent by the industry cloud server for the multiple slave devices; wherein the upgrade command comprises a device type, and an upgraded version number;
determining, by the master device, at least one slave device to be upgraded according to the upgrade command and the list of device information;
sending, by the master device, the upgrade command to the at least one slave device to be upgraded, so that the at least one slave device to be upgraded upgrades in response to the upgrade command; and
updating, by the master device, the list of device information of the at least one slave device to be upgraded;
wherein the device type in the list of device information of the at least one slave device to be upgraded, is same as the device type in the upgrade command; and
wherein the upgraded version number in the list of device information of the at least one slave device to be upgraded, is not the same as the upgraded version number in the upgrade command.

2. The method according to claim 1, wherein the establishing, by the industry field device, the communication connection with the other industry field device according to the device identifier configuration strategy, and further generating the list of device information comprises:
receiving, by the master device, a device identifier request sent by a slave device on its own initiative upon being powered on, wherein the device identifier request comprises at least device information of the slave device;
allocating, by the master device, a device identifier for the slave device according to the device information, and sending the device identifier to the slave device, so that the slave device is registered, and acknowledges, using the device identifier; and
generating, by the master device, the list of device information according to the device identifier and the device information.

3. The method according to claim 2, wherein allocating, by the master device, the device identifier for the slave device according to the device information comprises:
determining, by the master device, a preset range of values for the device identifier corresponding to the device identifier according to the device type, wherein the device information comprises at least the device type; and
allocating, by the master device, the device identifier for the slave device from the range of values for the device identifier according to the priority of the slave device.

4. The method according to claim 3, wherein the method further comprises:
receiving, by the master device, a registration acknowledgment information update message sent by the slave device, and determining that the slave device operates normally, and updating the list of device information corresponding to the slave device, in response to the registration acknowledgment information update message.

5. The method according to claim 2, wherein the method further comprises:
sending, by the master device, a preset message to the slave device at a preset periodicity; and
determining, by the master device, whether a response message of the slave device to the preset message is received, and if the response message of the slave device to the preset message is received, then determining that the slave device operates normally; if the response message of the slave device to the preset message is not received, determining that the slave device is powered off or goes offline, and deleting the information in the list of device information corresponding to the slave device.

6. The method according to claim 3, wherein the method further comprises:
sending, by the master device, a preset message to the slave device at a preset periodicity; and
determining, by the master device, whether a response message of the slave device to the preset message is received, and if the response message of the slave device to the preset message is received, then determining that the slave device operates normally; if the response message of the slave device to the preset message is not received, determining that the slave device is powered off or goes offline, and deleting the information in the list of device information corresponding to the slave device.

7. The method according to claim 4, wherein the method further comprises:
sending, by the master device, a preset message to the slave device at a preset periodicity; and
determining, by the master device, whether a response message of the slave device to the preset message is received, and if the response message of the slave device to the preset message is received, then determining that the slave device operates normally; if the response message of the slave device to the preset message is not received, determining that the slave device is powered off or goes offline, and deleting the information in the list of device information corresponding to the slave device.

8. An apparatus for controlling and managing a field device using an industry Internet operating system, comprising at least an industry cloud server and industry field devices, wherein:
  each industry field device is configured to receive a device identifier configuration strategy issued by the industry cloud server, to establish a communication connection with the other industry field device according to the device identifier configuration strategy, and to further generate a list of device information; and
  the industry field device is configured to send the list of device information to the industry cloud server on its own initiative, so that the industry cloud server controls the industry field devices according to the list of device information;
  wherein the industry field devices comprise a master device and multiple slave devices;
  wherein the master device is configured to:
  receive an upgrade command sent by the industry cloud server for the multiple slave devices; wherein the upgrade command comprises a device type, and an upgraded version number;
  determine at least one slave device to be upgraded according to the upgrade command and the list of device information;
  send the upgrade command to the at least one slave device to be upgraded, so that the at least one slave device to be upgraded upgrades in response to the upgrade command; and
  update the list of device information of the at least one slave device to be upgraded;
  wherein the device type in the list of device information of the at least one slave device to be upgraded, is same as the device type in the upgrade command; and
  wherein the upgraded version number in the list of device information of the at least one slave device to be upgraded, is not the same as the upgraded version number in the upgrade command.

9. The apparatus according to claim 8, wherein when each industry field device is configured to establish a communication connection with the other industry field device according to the device identifier configuration strategy, and to further generate a list of device information, the master device is configured to:
  receive a device identifier request sent by a slave device on its own initiative upon being powered on, wherein the device identifier request comprises at least device information of the slave device;
  allocate a device identifier for the slave device according to the device information, and to send the device identifier to the slave device, so that the slave device is registered, and acknowledges, using the device identifier; and
  generate the list of device information according to the device identifier and the device information.

10. The apparatus according to claim 9, wherein the master device configured to allocate the device identifier for the slave device according to the device information is configured:
  to determine a preset range of values for the device identifier corresponding to the device identifier according to the device type, wherein the device information comprises at least the device type; and
  to allocate the device identifier for the slave device from the range of values for the device identifier according to the priority of the slave device.

11. The apparatus according to claim 10, wherein the master device is further configured:
  to receive a registration acknowledgment information update message sent by the slave device, and to determine that the slave device operates normally, and to update the list of device information corresponding to the slave device, in response to the registration acknowledgment information update message.

12. The apparatus according to claim 9, wherein the master device is further configured:
  to send a preset message to the slave device at a preset periodicity; and
  to determine whether a response message of the slave device to the preset message is received, and if the response message of the slave device to the preset message is received, to determine that the slave device operates normally; if the response message of the slave device to the preset message is not received, to determine that the slave device is powered off or goes offline, and to delete the information in the list of device information corresponding to the slave device.

13. The apparatus according to claim 10, wherein the master device is further configured:
  to send a preset message to the slave device at a preset periodicity; and
  to determine whether a response message of the slave device to the preset message is received, and if the response message of the slave device to the preset message is received, to determine that the slave device operates normally; if the response message of the slave device to the preset message is not received, to determine that the slave device is powered off or goes offline, and to delete the information in the list of device information corresponding to the slave device.

14. The apparatus according to claim 11, wherein the master device is further configured:
  to send a preset message to the slave device at a preset periodicity; and
  to determine whether a response message of the slave device to the preset message is received, and if the response message of the slave device to the preset message is received, to determine that the slave device operates normally; if the response message of the slave device to the preset message is not received, to determine that the slave device is powered off or goes offline, and to delete the information in the list of device information corresponding to the slave device.

* * * * *